United States Patent [19]

Flora et al.

[11] 4,124,792

[45] Nov. 7, 1978

[54] EDDY CURRENT PROBE SUBSYSTEM

[75] Inventors: John H. Flora, Lynchburg, Va.; Nuri Akgerman, Columbus, Ohio

[73] Assignee: The United States of America as represented by the Secretary of the Army, Washington, D.C.

[21] Appl. No.: 818,631

[22] Filed: Jul. 25, 1977

[51] Int. Cl.² .............................................. B23K 9/00
[52] U.S. Cl. ............................ 219/124.34; 219/124.02
[58] Field of Search ..................... 219/124.02, 124.22, 219/124.34; 318/576, 647

[56] References Cited

U.S. PATENT DOCUMENTS

| | | | |
|---|---|---|---|
| 2,971,079 | 2/1961 | Sommeria | 219/124.34 |
| 3,268,805 | 8/1966 | Normando | 219/124.34 |
| 3,346,807 | 10/1967 | Wood et al. | 219/124.34 |
| 3,371,272 | 2/1968 | Stanton | 219/124.34 |
| 3,924,094 | 12/1975 | Hansen et al. | 219/124.34 |

FOREIGN PATENT DOCUMENTS

| | | | |
|---|---|---|---|
| 44-6,450 | 3/1967 | Japan | 219/125 PL |
| 1,436,348 | 5/1976 | United Kingdom | 219/125 PL |

*Primary Examiner*—J. V. Truhe
*Assistant Examiner*—Clifford C. Shaw
*Attorney, Agent, or Firm*—Peter A. Taucher; John E. McRae; Nathan Edelberg

[57] ABSTRACT

In a machine for edge welding magnetically permeable work pieces, e.g. armor plate, the improvement comprising probe means for centering the torch on the centerline of the gap between the work pieces. The probe also provides an electric signal representing the path taken by the torch along the gap joint. The signal can be used to program the machine for successive multiple passes over the gap joint.

1 Claim, 6 Drawing Figures

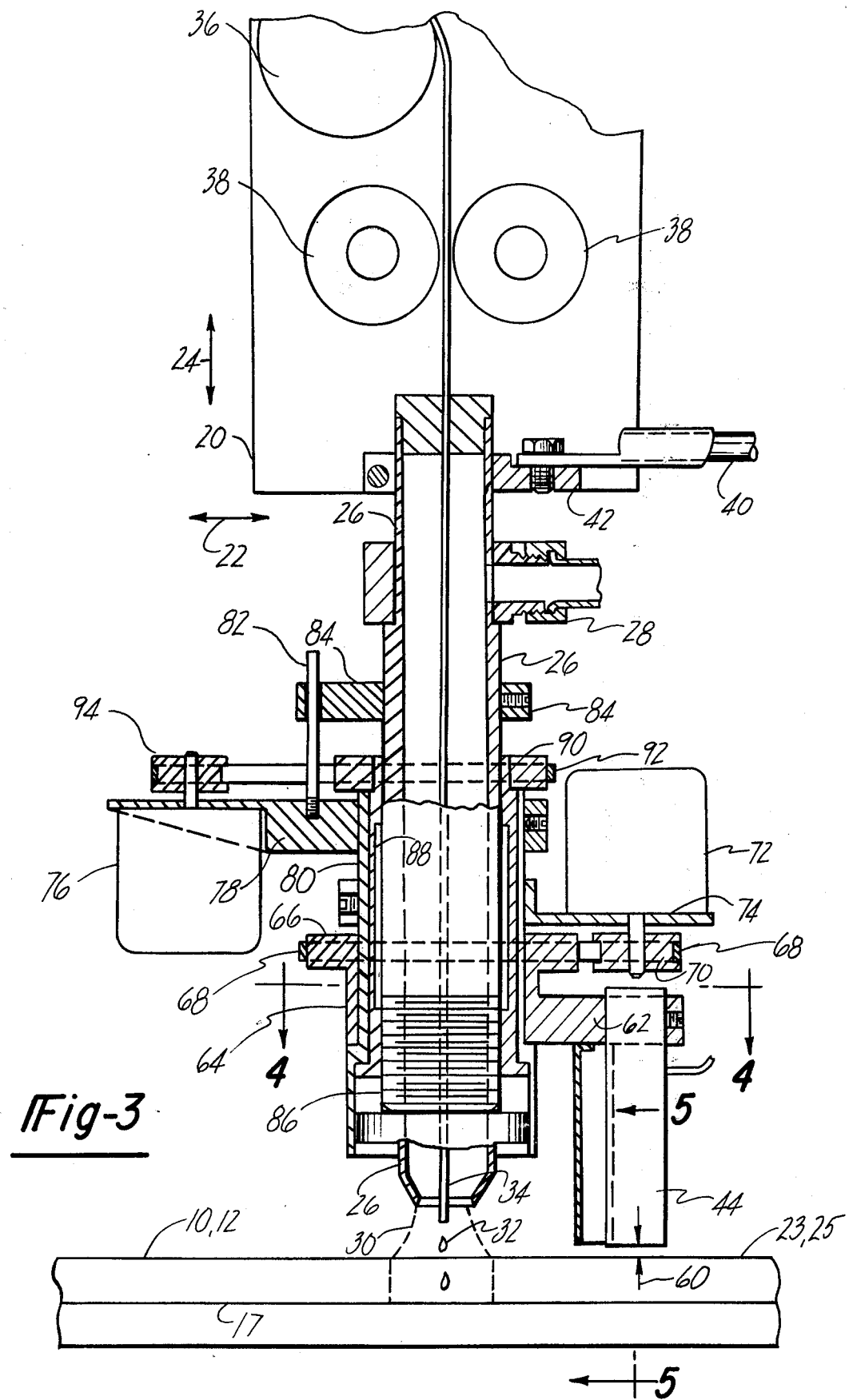

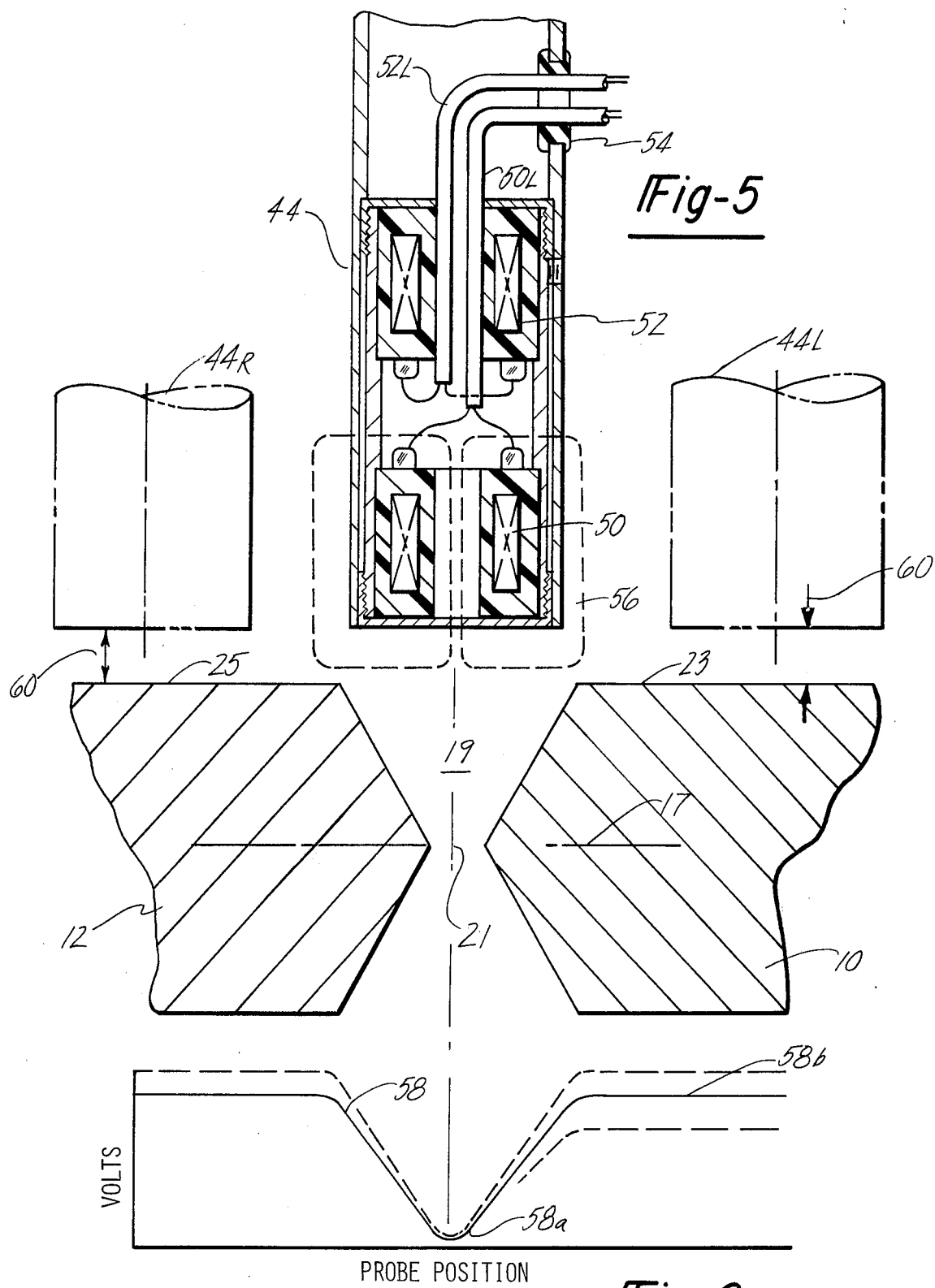

EDDY CURRENT PROBE SUBSYSTEM

BACKGROUND AND SUMMARY OF THE INVENTION

Thick steel plates of curved or irregular edge contour present a welding problem as regards accurate retracing of the machine over the irregular path during successive passes of the machine. The present invention provides an electrical probe device that automatically oscillates back and forth across the gap between the work pieces during the first pass of the welding machine therealong. The oscillating probe develops a signal of varying intensity related to the position of the gap. The minimum value of the generated signal may be used to center the welding torch that follows the probe; the minimum value of the signal may also be used as input to a computer that stores the signal for subsequently programming the machine during successive passes. The maximum value of the signal may be used to maintain the probe at a desired constant spacing above the work piece surface in spite of minor vertical oscillations of the torch that occur normally during an arc welding process.

The invention described herein may be manufactured, used, and licensed by or for the Government for governmental purposes without payment to us of any royalty thereon.

THE DRAWINGS

FIG. 3 illustrates some features of a welding machine utilized to produce the FIG. 1 weldment.

FIG. 5 is an enlarged fragmentary sectional view taken on line 5—5 in FIG. 3.

FIG. 6 is a graph illustrating the voltage signal produced by the electrical probe shown in FIG. 5.

Figure 1:
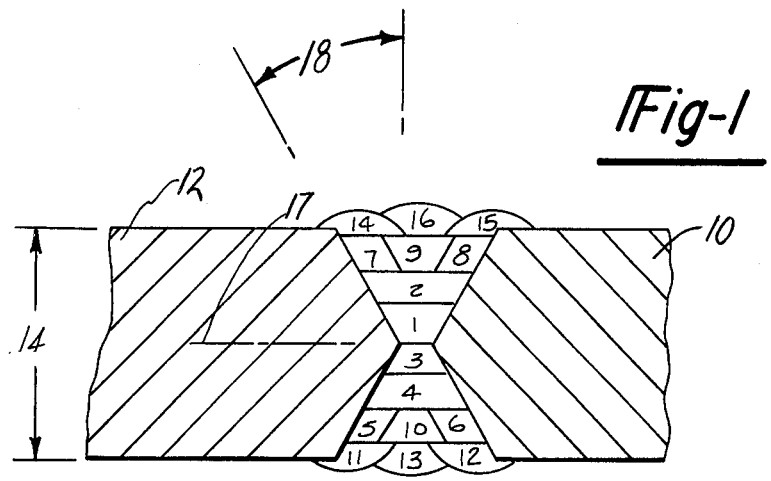
FIG. 1 is a sectional view taken through two work pieces after being welded together.
Figure 2:
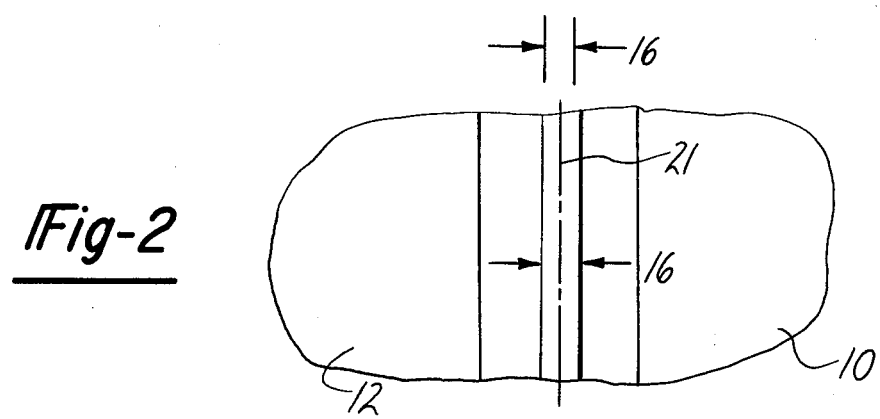
FIG. 2 is a top plan view of the FIG. 1 weldment.

Referring especially to FIG. 1, there is shown two steel work pieces 10 and 12, each having a thickness dimension 14 which may in an illustrative case be about 1½ inches. The bevelled facing edges of the work pieces are spaced apart by a gap dimension 16 which may for example be about 3/16 inch. Bevel angle 18 is usually about 30°.

To arc weld the work pieces 10 and 12 together it is necessary to deposit several fused electrode layers into the joint between the work pieces. FIG. 1 shows sixteen different electrode depositions or layers. Each deposited layer is achieved by a separate pass of the arc welder over the joint. In the usual setup the work pieces are positioned horizontally in a suitable fixture, and the arc welder is then caused to travel along the joint in the space above the work pieces; electrode wire is fed downwardly through a welding torch for fusion by an electric arc developed between the torch, wire, and work surface. In FIG. 1 the first deposited layer is identified by numeral 1, and succeeding layers are numbered accordingly; the work pieces (plates) are turned over to accommodate certain ones of the layers, e.g. layers 3, 4, 5, etc.

FIG. 3 illustrates some features of an arc welder used to form the weldment shown in FIG. 1. As schematically shown in FIG. 3, the welder comprises a carrier 20 capable of movement in three directions, namely horizontally along the joint between the work pieces as denoted by numeral 22, vertically, as denoted by numeral 24, and laterally normal to the plane of the paper. The carrier movements may be provided by conventional positioner mechanism of the type manufactured by the Ransome Company of Houston, Texas per its models 120P and model 99. The carrier mounts a vertical torch 26 equipped with a conventional fitting 28 for receiving a supply of argon gas. This torch may be a commercial item such as Linde Model ST-12 manufactured by Union Carbide Corporation of N.Y.

During welding operations the argon gas is discharged through the lower end of torch 26 to form a gas shield or envelope 30 for minimizing oxidation of the molten metal droplets 32 being deposited from the electrode wire 34 into the gap between work pieces 10 and 12. The wire electrode 34 is fed downwardly through the torch 26 from a wire supply reel 36 mounted on carrier 20. Conventional feed rolls 38, operated by electric motor means, not shown, provide a regulated wire feed. In conventional practice the wire feed rate is controlled by voltage sensitive devices to provide a continuous spray of molten material onto the surfaces of work pieces 10 and 12.

The lower end of the electrode wire 34 is melted by means of an electric arc passing across the gap between torch 26, wire 34, and the surface of work pieces 10 and 12. A high negative voltage is supplied to the torch from a remote source through a cable 40 that is suitably connected to a terminal 42 affixed to the upper end of the torch. The power supply source may be a conventional unit such as model LSC-750 of the Tektran Corporation, Lancaster, Ohio. As indicated, the described welding machine is conventional.

Figure 4:
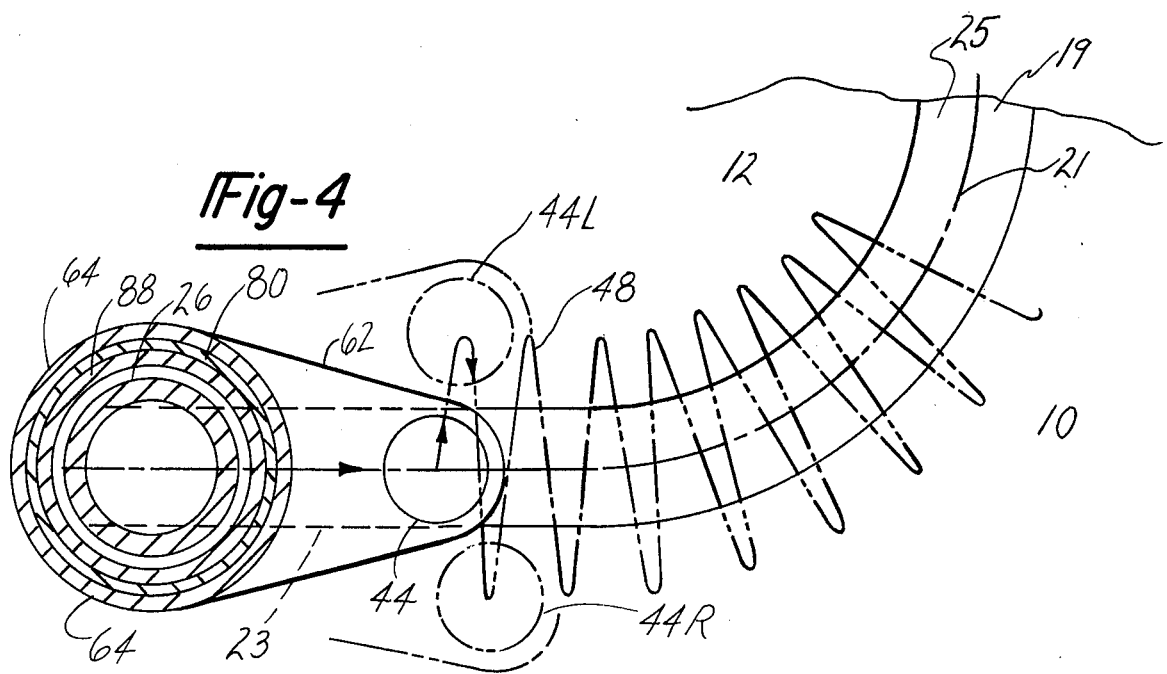
FIG. 4 is a sectional view taken on line 4—4 in FIG. 3.

The present invention is concerned principally with an attachment for the conventional welding machine. The principal structural features of the attachment are shown in FIG. 3. However the function of the attachment may be better visualized from FIGS. 4 and 5. FIG. 4 illustrates a section of the non-welded joint or gap 19 between work pieces 10 and 12. The centerline of the gap is designated by numeral 21. For illustration purposes the gap and its centerline are shown as including a relatively straight section 23 leading to a curved section 25. During the first pass of torch 26 it is necessary that the welding torch 26 follow or track centerline 21. The attachment shown in FIG. 3 is intended to guide the torch 26 accurately along centerline 21. The attachment is also intended to generate an electric signal that can be used by a computer to accurately control the path of the welding torch during successive passes of the machine along gap joint 19.

The attachment comprises a rod-like probe 44 aimed downwardly toward the work in front of torch 26, i.e. in the advance path of the torch. As the torch moves along gap 19 the probe 44 is caused to automatically oscillate back and forth across centerline 21, as indicated by the sinuous pathline 48. As best seen in FIG. 5, the probe contains an electric sensor coil 50 in its lower end and a compensator coil 52 above its lower end. Each coil contains the same number of turns and the same size wire. Lead wiring for the respective coils, designated by numerals 50L and 52L, is directed out of the probe housing through a grommet 54.

A high frequency A. C. source is connected to the lead wiring for sensor coil 50 and compensator coil 52. A. C. energization of coil 50 produces a magnetic field, designated by numeral 56 in FIG. 5. Cyclic reversals of the A. C. current cause magnetic flux changes which produce eddy currents and a back E. M. F. The back E. M. F. appears as a varying intensity impedance signal lagging behind the A. C. input. A commercially available detector, such as Model NDT-56A of Nortec Corporation, of Richland, Wash., can be connected to the coil lead wiring to pick up this impedance signal. The detector provides an output eddy current signal 58 (FIG. 6) having the slope shown in full lines. The detector preferably includes connections for electrically arranging coils 50 and 52 as legs in a balanced bridge circuit. Compensator coil 52 functions to eliminate spurious magnetic influences, such as might be generated by the electric arc at the lower end of torch 26.

The output 58 of the detector is a varying voltage signal having the slope shown in FIG. 6. By comparing FIGS. 5 and 6 it will be seen that the magnitude of eddy current signal 58 is affected by the proximity of sensor coil 50 to the surface of magnetically permeable work piece 10 or 12. In general, the eddy current signal (voltage) increases as the sensor coil moves closer to the work piece; as the sensor coil moves away from the work piece the signal diminishes. When the sensor coil is directly above the centerlin 21 of the gap the eddy current signal has a minimum value 58a; as the probe moves to the right or left, its sensor coil 50 moves closer to work piece surface 23 or 25, thereby raising the eddy current signal to its maximum value 58b.

Computer means, not shown, comprises peak value detectors (maximum or minimum values) for receiving the high and low signals 58b and 58a. Each low peak 58a may be utilized by the computer to guide the welding machine during its first pass over the joint. Additionally, each low peak 58a may be stored in the computer for subsequent use in controlling the welding machine during subsequent passes along the FIG. 4 joint. The maximum value peak 58b (FIG. 6) may be utilized by the computer to maintain the lower end of probe 44 at a pre-selected spacing 60 above the upper face 23 or 25 of the work piece in spite of oscillations of the torch 26 in a vertical direction during normal welder operation. The probe 44 is mounted on the torch 26 so that the probe can oscillate in a horizontal plane as shown in FIG. 4 and also in a vertical plane relative to the torch; the aim is to maintain a given probe-work surface spacing 60 in spite of normal vertical oscillations of the torch.

FIG. 3 illustrates the probe mounting means. The probe 44 is suspended from a mounting arm 62 that extends from a sleeve-like barrel 64. The upper end of barrel 64 defines a gear 66 whose peripheral edge engages an endless rubber belt 68. This belt is trained around a toothed gear or pulley 70 carried on the shaft of a reversibel electric motor 72 suitably mounted on a platform 74. Platform 74 is mounted so that it cannot rotate relative to torch 26; therefore rotation of reversible motor 72 causes the belt 68 to oscillate barrel 64 around the axis of torch 26. This action causes the attached probe 44 to oscillate back and forth across the advance path of the torch. Forward motion of the torch in a left to right direction (FIGS. 3 and 4), in combination with the action of motor 72, produces oscillatory probe movement designated by numeral 48 in FIG. 4.

Each time the probe passes across the gap centerline 21 (FIG. 4) it produces a low peak impedance signal 58a. Each low peak is utilized to suitably control the welding machine motor (not shown) which advances the torch along the joint between the work pieces. The successive peak signals 58a therefore direct or redirect the torch as necessary to keep it on the gap centerline 21.

During normal welding operations the relatively constant voltage supplied through cable 40 tends to produce a variable melt rate at the lower end of electrode 34, thereby changing the length of the arc between the wire and the work; arc length changes are accompanied by automatic vertical oscillations of torch 26. Since probe 44 is required to have a constant spacing 60 from the work surface 23, 25, it is necessary to provide a power means for oscillating the probe vertically relative to the torch. FIG. 3 illustrates an oscillation power means that comprises a reversible electric motor 76 suitably mounted on an arm 78 carried on a tube 80. Arm 78 can move vertically relative to torch 26 but not rotationally. The arm is non-rotatably keyed to the torch via an upstanding rod 82 that slidably extends through an opening in a bar 84 clamped to torch 26.

The outer surface of torch 26 is threaded, as at 86 for meshed engagement with internal threads on a sleeve 88. The upper end of sleeve 88 is affixed to a gear 90 whose outer edge receives a wrap-around belt 92. This belt runs around a pulley 94 carried on the shaft of reversible motor 76. Motor rotation causes belt 92 to rotate gear 90 and attached sleeve 88 around the axis of torch 26. The sleeve thereby is screwed up or down on the threads 86 of the torch. Rod 82 keys arm 78 and attached tube 80 against rotation around the torch axis; accordingly sleeve 80 forms a non-rotatable mount for platform 74 (which mounts the other motor 72). In general, motor 72 oscillates probe 44 along path 48, while motor 76 screws sleeve 88 up or down on torch 26 to maintain probe 44 at the proper spacing 60 relative to the work.

The arc generated at the lower end of torch 26 produces a magnetic field that can adversely affect the response of sensor coil 50. Therefore it is necessary to remove the influence of this arc-generated magnetic field. For this purpose there is provided a second compensating coil 52. This coil has the same wire size and number of turns as the sensor coil 50. Also, this compensator coil is located approximately the same distance from the arc-generating end of the torch as the sensor coil. Therefore coils 50 and 52 are influenced magnetically by the arc to approximately the same extent or magnitude. By electrically arranging the two coils in separate legs of an A. C. bridge circuit in the Nortec detector 56a it is possible to eliminate the errorproducing effect of the arc on the impedance signal 58. Compensator coil 52 is located a suitable distance above sensor coil 50 so that the magnetic field generated by coil 52 is not influenced by the work pieces 10 and 12. In one instance the lower end of coil 52 was about ½ inch above the upper end of coil 50.

It will be noted from FIGS. 3 and 4 that the amplitude of each oscillation 48 is determined by the length of arm 62 and the oscillation angle measured from the axis of torch 26. In one practical embodiment the effective length of arm 62 was about three inches. The oscillation angle of arm 62 around the torch 26 axis was about 40 degrees, sufficient to enable the probe to move entirely across the gap between the work pieces along the sinuous path 48. Since the probe 44 is located in advance of torch 26 it is necessary that the electric circuitry include a time delay between development of the impedance signal 58 and application of the control signal to the motor that operates carriage 20.

It should be noted that probe 44 is operatively utilized only during the first pass of the welding torch over the gap joint between the work pieces. During succeeding passes the probe 44 is either physically or functionally disconnected from the electrical control system. The welding torch is then controlled by the computer-memorized signals 58a produced during the first pass.

It can be seen from FIG. 1 that during certain passes of the torch the electrode material is deposited along a path that is slightly offset from the centerline 21 of the gap. For example such offsetting would be utilized for passes numbered 5, 6, 7, 8, 11, 12, 14 and 15. In a typical situation the offset for passes 5 through 8 would be about 0.25 inch, and the offset for passes 11, 12, 14 and 15 would be about 0.42 inches. Such offsetting can be accomplished by the computer, whereby the torch is caused to follow an offset path paralleling centerline 21. The memorized signals 58a are automatically combined with a pre-selected offset signal to program the welding torch in the correct fashion for each pass.

We wish it to be understood that we do not desire to be limited to the exact details of construction shown and described for obvious modifications will occur to a person skilled in the art.

We claim:

1. In a machine for arc welding magnetically permeable work pieces, comprising a tubular torch powered for movement over and along a gap-type joint defined by two laterally spaced work pieces, and a consummable wire electrode feedable axially through the torch for fusion and deposition in the defined joint: the improvement comprising means for generating electric signals representing the position of the torch relative to the gap-type joint, said signal-generating means including a sleeve (88) encircling the torch; said torch and sleeve having meshed threads (at 86) whereby the sleeve is adjustable in the direction of the torch axis; a tube (80) freely encircling said sleeve so that the sleeve can turn on the torch without transmitting a rotary force to the tube; two motor-support arms (74 and 78) affixed to said tube; key means (at 82, 84) for keying the tube to the torch, whereby the tube and associated support arms can be adjusted axially parallel to the torch axis; a barrel (64) freely encircling said tube; a probe mount arm (62) extending from the barrel in the advance path taken by the torch; a probe (44) carried by the mount arm so that a sensor surface of the probe is in a plane slightly spaced from the plane of the work pieces; means for oscillating the probe back and forth across the advance path to be taken by the torch, comprising a first reversible motor (72) mounted on one of the aforementioned support arms, aligned pulleys (70 and 66) carried by the first motor's shaft and barrel (64), and a belt (68) trained around the aligned pulleys; means for adjusting the probe parallel to the torch axis comprising a second motor (76) mounted on the other support arm, aligned pulleys (94 and 90) carried by the second motor's shaft and aforementioned tube (88), and a second belt (92) trained around the last-mentioned pulleys; said probe (44) including a first sensor coil (50) energized by an A.C. source so that an impedance signal of varying intensity is generated in the sensor coil during each oscillatory pass of the probe across the gap between the work pieces, and a second compensator coil (52) located approximately the same distance from the torch as the first coil so that each coil is similarly influenced by magnetic fields generated by the torch arc; said compensator coil being oriented within the probe so that it is substantially further away from the work pieces than the sensor coil.

* * * * *